(12) United States Patent
Kim

(10) Patent No.: US 10,255,447 B2
(45) Date of Patent: Apr. 9, 2019

(54) SECURE MESSAGE-SENDING METHOD USING PERSONALIZED TEMPLATE AND APPARATUS USING THE SAME

(71) Applicant: SK Planet Co., Ltd., Seongnam-si, Gyeonggi-do (KR)

(72) Inventor: Ju-Tae Kim, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 147 days.

(21) Appl. No.: 15/376,659

(22) Filed: Dec. 13, 2016

(65) Prior Publication Data

US 2017/0316216 A1  Nov. 2, 2017

(30) Foreign Application Priority Data

Apr. 28, 2016 (KR) .................. 10-2016-0051962

(51) Int. Cl.
*H04L 29/06* (2006.01)
*G06F 21/60* (2013.01)
*H04W 12/02* (2009.01)
*H04W 4/14* (2009.01)

(52) U.S. Cl.
CPC ........ *G06F 21/606* (2013.01); *H04L 63/0428* (2013.01); *H04W 4/14* (2013.01); *H04W 12/02* (2013.01)

(58) Field of Classification Search
CPC ... G06F 21/606; H04L 63/04; H04L 63/0428; H04L 63/0471; H04W 12/02; H04W 4/14
USPC ......................................................... 726/26
See application file for complete search history.

(56) References Cited

U.S. PATENT DOCUMENTS

| | | | |
|---|---|---|---|
| 2014/0149288 A1* | 5/2014 | Martini | G06Q 20/405 |
| | | | 705/44 |
| 2017/0187690 A1* | 6/2017 | Lancioni | H04L 63/0428 |
| 2017/0270521 A1* | 9/2017 | Good | G06Q 20/401 |

FOREIGN PATENT DOCUMENTS

| | | |
|---|---|---|
| JP | 2014-016708 A | 1/2014 |
| KR | 10-2008-0022809 A | 3/2008 |
| KR | 10-1559380 B1 | 10/2015 |

* cited by examiner

*Primary Examiner* — Yogesh Paliwal
(74) *Attorney, Agent, or Firm* — Brinks Gilson & Lione

(57) ABSTRACT

Disclosed herein are a secure message-sending method using a personalized template and an apparatus using the method. A personalized template for a message service is acquired from a user. A personalized message to be sent to a terminal of the user is generated based on the personalized template. A secure message is generated by obfuscating the personalized message in accordance with the personalized template, and the secure message is sent to the terminal. Accordingly, it is possible to provide secure messages without requiring the construction of separate infrastructure.

8 Claims, 9 Drawing Sheets

SECURE MESSAGE-SENDING METHOD USING PERSONALIZED TEMPLATE AND APPARATUS USING THE SAME

CROSS REFERENCE TO RELATED APPLICATION

This application claims the benefit of Korean Patent Application No. 10-2016-0051962, filed Apr. 28, 2016, which is hereby incorporated by reference in its entirety into this application.

BACKGROUND OF THE INVENTION

1. Technical Field

The present invention relates generally to message security technology and, more particularly, to a secure message-sending method using a personalized template and an apparatus using the method, which configure a message based on fields selected by a user and obfuscate the message with characters that cannot be easily understood by machines, thus protecting messages from a normalized hooking program.

2. Description of the Related Art

In most message services, such as a commercial advertisement Short Message Service (SMS) for sending commercial advertisements and an informational SMS or Multimedia Message Service (MMS) for sending informational messages, the contents of messages are formed based on a single template, and thus those services tend to be vulnerable to the leakage of personal information caused by SMS hooking. Further, commercial SMS does not efficiently deliver the information desired by each individual.

For example, referring to commercial SMS, the accumulation and usage of membership points, bank statements, etc. are sent based on a designated template. Due thereto, the following two problems may chiefly arise.

First, SMS messages are sent without sorting information desired by the user from information not desired by the user. In the case of a debit card, after the approval of payment, the payment amount may be known, but the current balance of the debit card cannot be known. In the case of a credit card, information about a cumulative payment amount (total amount spent on the credit card) is sent in most cases even to a user who does not desire to know his or her cumulative payment amount.

Second, there is a possibility that information contained in SMS messages may be leaked based on SMS hooking due to programs including malicious code. The information sent via SMS may be usefully utilized, as in the case of an application which keeps household account records, by collecting card payment details, but personal information about each user, such as the amount of expenditure and the name of the bank mainly used by the user, may be illegally used as undesired marketing data without permission.

In order to solve these problems, a method for encrypting the contents of messages and sending the encrypted messages has been presented, but this method may be applied only when a separate program for decryption is installed on a client, and thus it is difficult to popularize such a method. Further, a method for delivering information contained in SMS messages in the form of images rather than text is effective in MMS technology, but there is a difficulty in commercializing the method for the reason of limited transmission capacity or the like when this information is sent in the form of text messages (SMS messages). In connection with this, Korean Patent No. 10-1559380 (Date of Registration: Oct. 5, 2015) discloses a technology related to "Apparatus and method for obfuscating contents."

SUMMARY OF THE INVENTION

Accordingly, the present invention has been made keeping in mind the above problems occurring in the prior art, and an object of the present invention is to configure a message using a personalized template, thus enabling a user to be selectively provided only with required data.

Another object of the present invention is to prevent or minimize damage resulting from a malicious program for hooking SMS or MMS messages by utilizing a personalized template.

A further object of the present invention is to prevent damage resulting from a hooking program by obfuscating messages.

In accordance with an aspect of the present invention to accomplish the above objects, there is provided a secure message-sending server, including a personalized template acquisition unit for acquiring a personalized template for a message service from a user; a personalized message generation unit for generating a personalized message to be sent to a terminal of the user based on the personalized template; and a secure message-sending unit for generating a secure message by obfuscating the personalized message in accordance with the personalized template, and for sending the secure message to the terminal.

The personalized message generation unit may generate the personalized message so that, among multiple data fields constituting a message based on the message service, one or more data fields, designated in accordance with the personalized template, are included in the personalized message.

The secure message-sending unit may check types of the one or more data fields and generate the secure message using security characters in a mode corresponding to the types.

The secure message-sending unit may include a security character replacement unit for replacing characters included in the one or more data fields with the security characters in consideration of a meaning of the characters; and a security character insertion unit for inserting the security characters into spaces between the one or more data fields.

The secure message-sending unit may be configured to, when each of the one or more data fields is a number field composed of numbers, perform obfuscation based on the replacement, and when each of the one or more data fields is a character field composed of characters other than numbers, perform obfuscation based on the insertion.

The security character replacement unit may replace each of numbers included in the one or more data fields with a character, rather than a number, that has a pronunciation identical to that of the number.

The security characters may include at least one of a space character and a Unicode Private Use Area (PUA) character.

The personalized template acquisition unit may acquire fields, selected by the user from among the multiple data fields, as the one or more data fields, and create the personalized template in consideration of arrangement of the one or more data fields.

The multiple data fields may include a date field, a time field, a payment amount field, a cumulative amount field, a payment means field, a payment location field, a point field, and a payer field.

In accordance with another aspect of the present invention to accomplish the above objects, there is provided a secure message-sending method, including acquiring a personalized template for a message service from a user; generating a personalized message to be sent to a terminal of the user based on the personalized template; and generating a secure message by obfuscating the personalized message in accordance with the personalized template, and sending the secure message to the terminal.

Generating the personalized message may be configured to generate the personalized message so that, among multiple data fields constituting a message based on the message service, one or more data fields, designated in accordance with the personalized template, are included in the personalized message.

Sending the secure message may be configured to check types of the one or more data fields and generate the secure message using security characters in a mode corresponding to the types.

Sending the secure message may include replacing characters included in the one or more data fields with the security characters in consideration of a meaning of the characters; and inserting the security characters into spaces between the one or more data fields.

Sending the secure message may be configured to, when each of the one or more data fields is a number field composed of numbers, perform obfuscation based on the replacement, and when each of the one or more data fields is a character field composed of characters other than numbers, perform obfuscation based on the insertion.

Replacing the characters may be configured to replace each of numbers included in the one or more data fields with a character, rather than a number, that has a pronunciation identical to that of the number.

The security characters may include at least one of a space character and a Unicode Private Use Area (PUA) character.

Acquiring the personalized template may be configured to acquire fields, selected by the user from among the multiple data fields, as the one or more data fields, and create the personalized template in consideration of arrangement of the one or more data fields.

The multiple data fields may include a date field, a time field, a payment amount field, a cumulative amount field, a payment means field, a payment location field, a point field, and a payer field.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
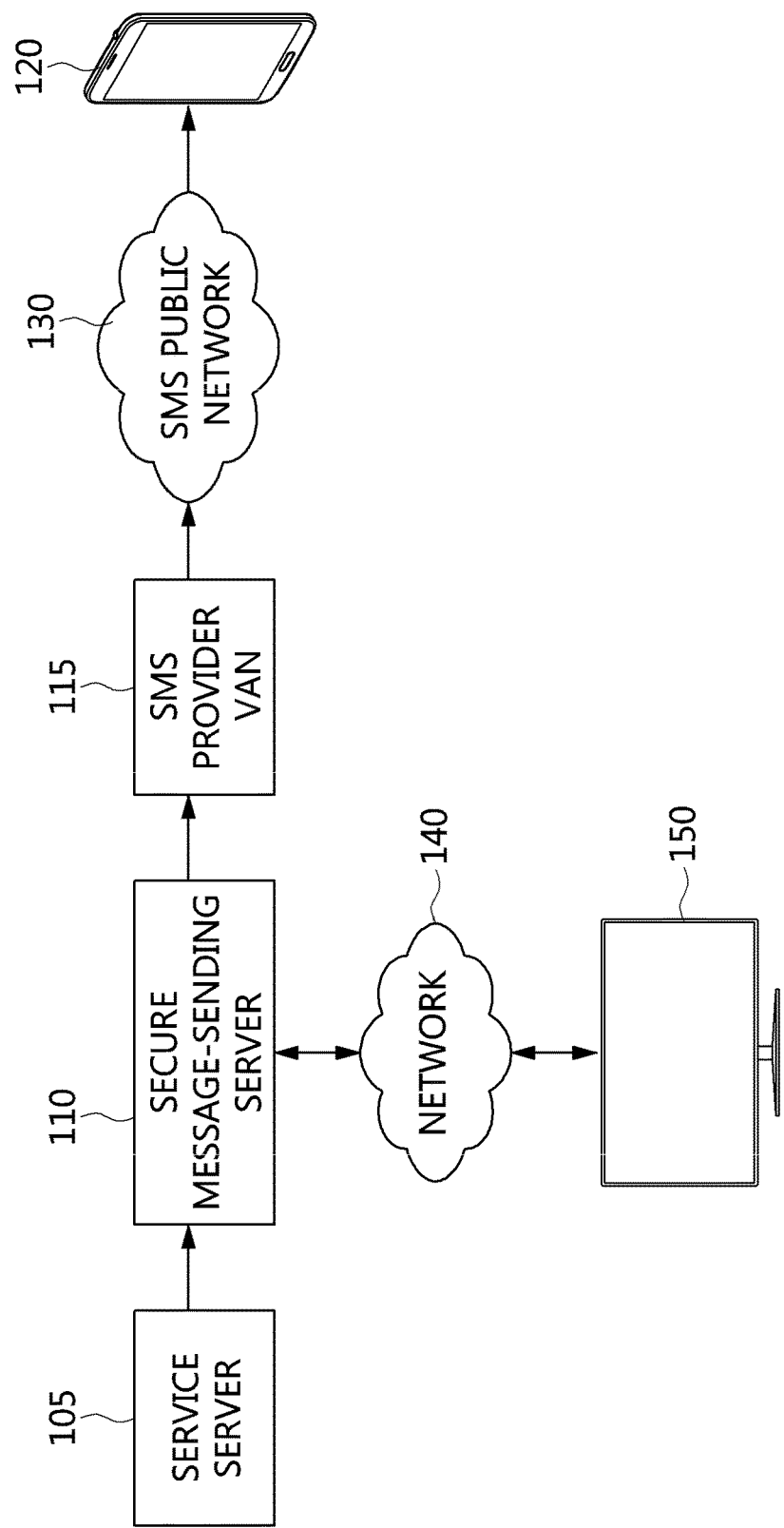
FIG. 1 is a block diagram showing a secure message-sending system using a personalized template according to an embodiment of the present invention.

Embodiments of the present invention will be described in detail with reference to the attached drawings. However, in the following description and drawings, detailed descriptions of known functions or configurations which are deemed to make the gist of the present invention obscure will be omitted. Further, it should be noted that the same reference numerals are used to designate the same or similar elements throughout the drawings. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Prior to the following detailed description of the present invention, it should be noted that the terms and words used in the specification and the claims should not be construed as being limited to ordinary meanings or dictionary definitions, and that an inventor can appropriately define the concepts of terms in order to best describe his or her invention. Meanwhile, the embodiments described in the present specification and the configurations illustrated in the drawings are merely preferable embodiments and do not exhaustively present the technical spirit of the present invention. Accordingly, it should be appreciated that there may be various equivalents and modifications that can replace the embodiments and the configurations at the time at which the present application is filed. Further, terms such as "first" or "second" may be used to describe various components, and are merely used to distinguish one component from other components, but are not intended to limit the components.

FIG. 1 is a block diagram showing a secure message-sending system using a personalized template according to an embodiment of the present invention.

Referring to FIG. 1, the secure message-sending system using a personalized template according to the embodiment of the present invention includes a service server 105, a secure message-sending server 110, an SMS provider Value-Added Network (VAN) 115, a terminal 120, an SMS public network 130, a network 140, and a user Personal Computer (PC) 150.

The service server 105 may generate a message-sending event for the terminal 120 of a user based on information such as payment, reservation, or purchase information as the user uses service provided based on the service server 105. For example, when the service server 105 is a server for providing service related to banks, an event for transmitting bank statement information related to a bankbook may be generated. Further, when the service server 105 is a server for providing service related to a payment means such as a debit card or a credit card, a message-sending event for providing payment information to the terminal 120 of the user may be generated.

The secure message-sending server 110 may be a server for generating a message to be provided to the terminal of the user as the message-sending event is generated by the service server 105.

The secure message-sending server 110 acquires a personalized template for a message service from the user.

Here, fields selected by the user from among multiple data fields are acquired as one or more data fields, and the personalized template may be created in consideration of the arrangement of the one or more data fields.

In this case, the multiple data fields may include a date field, a time field, a payment amount field, a cumulative amount field, a payment means field, a payment location (place) field, a point field, a payer field, etc.

Further, the secure message-sending server 110 generates a personalized message to be sent to the terminal 120 of the user based on the personalized template.

The personalized message may be generated such that, among the multiple data fields constituting a message based on the message service, the one or more data fields designated in accordance with the personalized template are contained in the personalized message.

Furthermore, the secure message-sending server 110 generates a secure message by obfuscating the personalized message in accordance with the personalized template, and sends the secure message to the terminal.

Here, the types of one or more data fields may be checked, and the secure message may be generated using security characters in a mode corresponding to the checked types.

Characters included in the one or more data fields may be replaced with security characters in consideration of the meaning of the characters.

Here, security characters may be inserted into spaces between the one or more data fields.

When each of the data fields is a number field composed of numbers, obfuscation may be performed based on replacement with security characters, whereas when each of the data fields is a character field composed of characters other than numbers, obfuscation may be performed based on insertion of security characters.

A number included in each data field may be replaced with a character (letter), rather than a number, that has the same pronunciation as that of the number or has a shape similar to that of the number.

Here, the security characters may include at least one of a space character and a Unicode Private Use Area (PUA) character.

The SMS provider Value-Added Network (VAN) 115 may be a VAN acting as an intermediary for sending the secure message, generated by the secure message-sending server 110, to the terminal 120 of the user. That is, the message may be sent to the terminal 120 of the user over the SMS public network 130 operated by the SMS provider VAN 115.

The terminal 120 may receive the message from the secure message-sending server 110 and may provide the message to the user.

Also, the terminal 120 is not limited to a mobile communication terminal, but may be any of various terminals such as all types of data communication equipment, multimedia terminals, and Internet Protocol (IP) terminals. Further, the terminal 120 may be any of mobile terminals having various mobile communication specifications, such as a mobile phone, a Portable Multimedia Player (PMP), a Mobile Internet Device (MID), a smart phone, a tablet PC, a notebook, a Netbook, a Personal Digital Assistant (PDA), a smart TV, and data communication equipment.

Furthermore, the terminal 120 may receive various types of information such as number and character information, and may deliver signals that are input in relation to the setting of various functions and the control of the functions of the terminal 120 to a control unit through an input unit. The input unit of the terminal 120 may be configured to include at least one of a keypad and a touch pad for generating an input signal in response to the user's touch or manipulation. Here, the input unit of the terminal 120 may be configured in the form of a single touch panel (or a touch screen), together with the display unit of the terminal, and may simultaneously perform both an input function and a display function. Further, the input unit of the terminal 120 may be implemented as all types of input means that can be developed in the future in addition to an input device such as a keyboard, a keypad, a mouse, or a joystick.

In addition, the display unit of the terminal 120 may display information about a series of operating states and operation results which occur while the terminal 120 performs functions. Further, the display unit of the terminal 120 may display the menu of the terminal 120, user data entered by the user, etc. Here, the display unit of the terminal 120 may be implemented as a Liquid Crystal Display (LCD), a Thin Film Transistor LCD (TFT-LCD), a Light-Emitting Diode (LED), an Organic LED (OLED), an Active Matrix OLED (AMOLED), a retina display, a flexible display, a three-dimensional (3D) display, or the like. When the display unit of the terminal 120 is implemented as a touch screen, the display unit of the terminal 120 may perform some or all of the functions of the input unit of the terminal 120.

In addition, the storage unit of the terminal 120 is a device for storing data, includes a main memory unit and an auxiliary memory unit, and is capable of storing an application program required for the functional operation of the terminal 120. The storage unit of the terminal 120 may chiefly include a program area and a data area. Here, when each function is activated in response to a request from the user, the terminal 120 executes the corresponding application program under the control of the control unit and provides each function. In particular, the storage unit of the terminal 120 according to the present invention may store an Operating System (OS) for booting the terminal 120, a membership application, etc. Further, the storage unit of the terminal 120 may store a content database (DB) for storing a plurality of pieces of content and information about the terminal 120. In this regard, the content DB may include execution data required to execute content and attribute information about the content, and may store content usage information related to the execution of the content. Also, the information about the terminal 120 may include terminal specification information.

Meanwhile, the communication unit of the terminal 120 may perform the function of transmitting and receiving data to and from the secure message-sending server 110 over the network. Here, the communication unit of the terminal 120 may include a Radio Frequency (RF) transmission means for up-converting the frequency of a signal to be transmitted and amplifying the frequency up-converted signal, and an RF reception means for low-noise amplifying a received signal and down-converting the frequency of the amplified signal. The communication unit of the terminal 120 may include at least one of a wireless communication module and a wired communication module. The wireless communication module is a component for transmitting and receiving data according to a wireless communication method. When the terminal 120 uses wireless communication, the terminal 120 may transmit and receive data using any one of a wireless network communication module, a Wireless Local Area Network (WLAN) communication module, and a Wireless Personal Area Network (PAN) communication module. That is, the terminal 120 may be connected to the network through the wireless communication module, and may transmit and receive data over the network.

The control unit of the terminal 120 may be a processing device for running an Operating System (OS) and individual components. Further, the control unit of the terminal 120 may execute specific content stored in the storage unit of the terminal 120 in response to the request from the user. Here, the control unit may store a content usage history related to the execution of the content as content usage information.

The network 140 provides a path through which data is transferred between the secure message-sending server 110 and the user PC 150, and is a concept including both existing networks that have been conventionally used and networks that may be developed in the future. For example, such a network may be any one of a wired/wireless LAN for providing communication between various types of information devices in a limited area, a mobile communication network for providing communication between individual moving objects and between a moving object and an external system outside the moving object, a satellite communication network for providing communication between individual earth stations using satellites, and a wired/wireless communication network, or a combination of two or more thereof. Meanwhile, transfer mode standards for the network are not limited to existing transfer mode standards, but may include all transfer mode standards to be developed in the future.

The user PC 150 may be a terminal which is used by the user so as to provide information for creating a personalized template to the secure message-sending server 110. For example, the user may access the secure message-sending server 110 through the user PC 150, and may provide information for creating the personalized template by selecting only desired data fields from among multiple data fields which can be included in the personalized template.

At this time, it may be possible for the user to perform not only a task of simply selecting data fields, but also a task of personally creating the configuration of the personalized template through the user PC 150.

Further, although the information for creating a personalized template is provided through the separate user PC 150 in FIG. 1, it may be possible to directly access the secure message-sending server 110 through the terminal 120 of the user and to provide the information for creating a personalized template.

Figure 2:
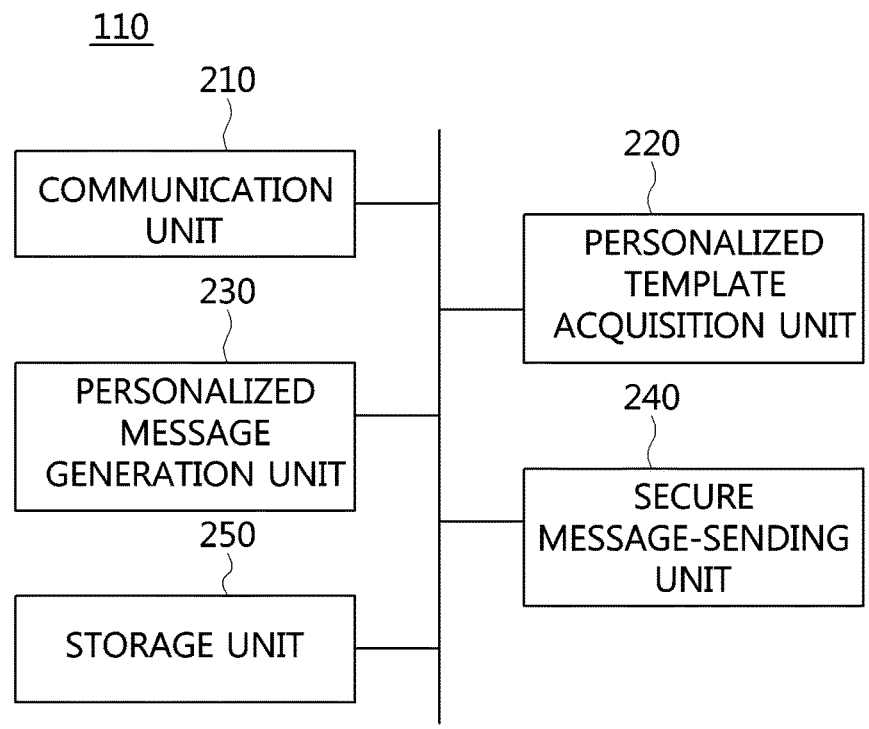
FIG. 2 is a block diagram showing an example of the secure message-sending server shown in FIG. 1.

FIG. 2 is a block diagram showing an example of the secure message-sending server shown in FIG. 1.

Referring to FIG. 2, the secure message-sending server 110 shown in FIG. 1 includes a communication unit 210, a personalized template acquisition unit 220, a personalized message generation unit 230, a secure message-sending unit 240, and a storage unit 250.

The communication unit 210 may transmit and receive information, required to send a secure message, to and from either a service server for providing a message service over the communication network such as a typical network, or the user terminal. In particular, the communication unit 210 according to the embodiment of the present invention may receive a message-sending event from the service server and may send a generated secure message to the terminal of the user.

The personalized template acquisition unit 220 acquires a personalized template for the message service from the user.

Most malicious programs for hooking messages based on a Short Message Service (SMS) or a Multimedia Message Service (MMS) may be operated such that when each message is received by the terminal of the user, SMS messages are sorted using a normalized template, which is the basic structure of messages, and required data is extracted from the sorted SMS messages. In this case, assuming that the template of the message deviates from a normalized form, the probability that the corresponding SMS message will be analyzed by a malicious program and then data will be leaked may be decreased.

Therefore, in order to minimize the damage resulting from data leakage caused by such a malicious program, the present invention may apply a personalized template for an SMS message to be received to each individual and may use the personalized template. That is, since most personalized templates may be differently configured for respective users, it may be difficult to seize data using a malicious program.

In order to acquire a personalized template, information for creating the personalized template may be first acquired through the terminal of the user such as a PC.

In this case, among multiple data fields, the fields selected by the user may be acquired as one or more data fields, and a personalized template may be created in consideration of the arrangement of the one or more data fields.

For example, the user may access a program or an application corresponding to the secure message-sending server 110 using a PC and may then select one or more data fields. That is, when multiple data fields are provided to the user through the program or application corresponding to the secure message-sending server 110, the user may select one or more data fields so that only required information, among the multiple data fields, is contained in a message.

For example, when a personalized template related to payment is created, the secure message-sending server 110 may provide the following multiple data fields.

{payment date}{payment amount}{total payment amount}{payment store name}

Here, when the user desires to check only {payment date}, {payment amount}, and {payment store name}, among the given multiple data fields, via a message, a personalized template may be created by selecting only the corresponding fields.

In addition to the PC of the user, all means capable of delivering information for creating the personalized template to the secure message-sending server 110 may be utilized.

Further, even if the configurations of the one or more data fields are identical to each other, personalized templates including the data fields may be recognized as different personalized templates according to the arrangement of the data fields.

For example, it may be assumed that both of two messages for providing payment details include a date field, a time field, and a payment amount field. At this time, when one message contains these elements in the sequence of the date field, the time field, and the payment amount field, and the other message contains these elements in the sequence of the payment amount field, the time field, and the date field, the templates of the two messages may be determined to be different from each other.

Therefore, when information about a personalized template is acquired from the user, information about the sequence of data fields included in the personalized template may also be acquired together with information about the data fields.

The personalized message generation unit 230 generates a personalized message to be sent to the terminal of the user based on the personalized template.

For example, when a message-sending event occurs from the service server, a personalized message containing only the information desired by the user may be generated based on message contents corresponding to the message-sending event and the personalized template.

In this case, the personalized message may be generated such that, among multiple data fields constituting a message via the message service, one or more data fields designated in accordance with the personalized template are contained in the personalized message.

Here, the multiple data fields may include a date field, a time field, a payment amount field, a cumulative amount field, a payment means field, a payment location field, a point field, a payer field, etc.

characters other than numbers is checked. Then, a secure message may be generated using security characters in the mode corresponding to the result of the checking.

Here, in consideration of the meaning of the characters included in the one or more data fields, the characters may be replaced with security characters.

In this regard, a separate obfuscation table is configured, and characters included in the obfuscation table, among the characters contained in the message, may be replaced with security characters set in the obfuscation table.

For example, it may be assumed that the obfuscation table is generated as shown in the following Table 1.

TABLE 1

| Character contained in message | Security character |
| --- | --- |
| 0(number) | O (Korean), o(English), 영 (Korean pronunciation of 0), 공 (another Korean pronunciation of 0) |
| 1 | \|(symbol), I(English), 일 (Korean pronunciation of 1) |
| 2 | 이(Korean pronunciation of 2) |
| ... | ... |

In an example, when the message service is a service for providing payment details, a date field indicating the date on which payment was made, a time field indicating the time at which payment was made, a payment amount field indicating the amount paid for a product, a payment location field indicating the store in which payment was made, etc. may correspond to the multiple data fields.

In another example, in the case of a message service for providing usage details for a credit card, a payment means field indicating information about a credit card used for payment, a date field and a time field indicating the date and time at which the credit card was used, a payment amount field indicating the amount paid by the credit card, a cumulative amount field indicating a total amount cumulatively spent on the credit card to date, etc. may correspond to the multiple data fields.

That is, depending on the types of message service, the types of the multiple data fields may also vary.

The secure message-sending unit 240 generates a secure message by obfuscating the personalized message in accordance with the personalized template, and sends the secure message to the terminal.

In this regard, by means of obfuscation, the effect of secondarily preventing malicious programs from hooking messages may be provided. That is, malicious programs may extract required information by analyzing messages based on data having a specific word or a specific structure. For example, when a specific word contained in a message is composed of only numbers, a malicious program may extract information by determining the corresponding message to be data related to a payment amount or data related to a date.

Therefore, in order to prevent this problem, the secure message may be generated by obfuscating the contents of the message with characters that cannot be recognized by software such as a malicious program or a system, but can be recognized by a human being.

In this case, the types of one or more data fields may be checked, and the secure message may be generated using security characters in a mode corresponding to the checked types.

For example, whether the data field is a date field or a payment amount field mainly composed of numbers or whether the data field is a location field mainly composed of Assuming that date information such as 'date: 2016-02-12' is contained in a personalized message, the date information may be replaced by 'date: 이공일육-o2-1이' via the obfuscation table.

In this case, the obfuscation table may be continuously updated. Further, when multiple security characters match a single character, a great variety of obfuscation may be realized by randomly utilizing the security characters to be used for replacement.

Moreover, security characters may be inserted into spaces between one or more data fields.

In an example, assuming that contents indicating 'date: 2016-03-01, amount: 5,000 Won, where: Pangyo branch' are contained in the 'personalized message', obfuscation may be realized by inserting security characters into spaces between data fields, like 'date: 2016-03-01, !@#$amount: 5,000 Won, ㄱㄴㄷㄹ where: Pangyo branch'.

In another example, security characters may be inserted into the contents of a data field. That is, as in the above example, assuming that contents indicating 'date: 2016-03-01, amount: 5,000 Won, where: Pangyo branch' are contained in a personalized message, obfuscation may be realized by inserting security characters into a single data field, like 'da&te: 2016-ㄱ03-ㄴ01, 2016, aㅌmount: ㄷ5,000 Won, wheˆre: Pangyo branch'.

That is, the obfuscation of a personalized message according to the present invention may be a process performed such that, when the user views a message through the terminal, he or she can understand the meaning of the message, but it is difficult for a computer system such as a malicious program to identify the meaning of the personalized message, thus preventing data from being extracted.

When each of the one or more data fields is a number field composed of numbers, obfuscation may be performed based on replacement with security characters, whereas when each of the one or more data fields is a character field composed of characters other than numbers, obfuscation may be performed based on the insertion of security characters.

For example, numbers such as 1, 2, and 3 may be converted into Korean characters such as '일, 이, and 삼' and into characters such as I, II, and III, but it may be difficult to convert characters other than numbers into other characters.

Therefore, it is first determined whether a data field included in a personalized message is a number field composed of mostly numbers, or a character field composed of characters other than numbers, and then a suitable obfuscation method may be selected.

Here, a number included in each of the one or more data fields may be replaced with a character (letter), rather than a number, that has the same pronunciation as that of the number or has a shape similar to that of the number.

For example, '0' may be replaced with '영' or '공,' having the same pronunciation as '0' when spoken, and '1' may be replaced with '일'.

Here, security characters may include at least one of a space character and a Unicode Private Use Area (PUA) character. For example, assuming that contents indicating 'payment amount: 12,000 Won, place: A Mart' are contained in a personalized message, obfuscation may be realized by changing the contents to 'payment a mount: 1 2, 0 0 0 Won, place: A Mar t' using space characters.

As described above, the storage unit 250 stores various types of information generated during a secure message-sending procedure according to an embodiment of the present invention.

In an embodiment, the storage unit 250 may be configured independently of the secure message-sending server 110 to support a secure message-sending function. Here, the storage unit 250 may function as separate large-capacity storage and may include a control function for performing operations.

Meanwhile, the secure message-sending server 110 may be equipped with memory and store information therein. In an embodiment, the memory is a computer-readable medium. In an embodiment, the memory may be a volatile memory unit, and in another embodiment, the memory may be a nonvolatile memory unit. In an embodiment, a storage device is a computer-readable medium. In various different embodiments, the storage device may include, for example, a hard disk device, an optical disk device, or any type of large-capacity storage device.

By utilizing such a secure message-sending server, each message is configured based on a personalized template, thus allowing the user to be selectively provided only with required data.

Also, since a personalized template is used, damage resulting from a malicious program for hooking SMS or MMS messages may be prevented or minimized.

Furthermore, since each message is obfuscated, damage resulting from hooking programs may be prevented.

Figure 3:
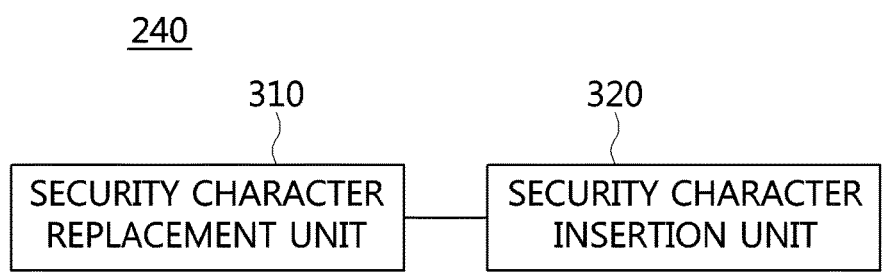
FIG. 3 is a block diagram showing an example of the secure message-sending unit shown in FIG. 2.

FIG. 3 is a block diagram showing an example of the secure message-sending unit shown in FIG. 2.

Referring to FIG. 3, the secure message-sending unit 240 shown in FIG. 2 includes a security character replacement unit 310 and a security character insertion unit 320.

The security character replacement unit 310 replaces characters included in one or more data fields with security characters in consideration of the meaning of the characters.

Here, a separate obfuscation table is configured, and characters included in the obfuscation table, among characters contained in a message, may be replaced with security characters set in the obfuscation table.

For example, replacement may be performed using an obfuscation table which includes characters contained in a message and security characters matching the characters.

Assuming that date information such as 'date: 2016-02-12' is contained in a personalized message, the date information may be replaced by 'date: 이공일육-o2-1이' via the obfuscation table.

In this case, the obfuscation table may be continuously updated. Further, when multiple security characters match a single character, a great variety of obfuscation may be implemented by randomly utilizing the security characters to be used for replacement.

When each of the one or more data fields is a number field composed of numbers, obfuscation may be performed based on replacement with security characters, whereas when each of the one or more data fields is a character field composed of characters other than numbers, obfuscation may be performed based on the insertion of security characters.

For example, numbers such as 1, 2, and 3 may be converted into Korean characters such as '일, 이, and 삼' and into characters such as I, II, and III, but it may be difficult to convert characters other than numbers into other characters.

Therefore, it is first determined whether a data field included in a personalized message is a number field composed of mostly numbers, or a character field composed of characters other than numbers, and then a suitable obfuscation method may be selected.

Here, a number included in each of the one or more data fields may be replaced with a character (letter), rather than a number, that has the same pronunciation as that of the number or has a shape similar to that of the number.

For example, '0' may be replaced with '영' or '공,' having the same pronunciation as '0' when spoken, and '1' may be replaced with '일'.

The security character insertion unit 320 inserts security characters into spaces between one or more data fields.

In an example, assuming that contents indicating 'date: 2016-03-01, amount: 5,000 Won, where: Pangyo branch' are contained in the 'personalized message', obfuscation may be realized by inserting security characters into spaces between data fields, like 'date: 2016-03-01, !@#$amount: 5,000 Won, ㄱㄴㄷㄹ where: Pangyo branch'.

In another example, security characters may be inserted into the contents of a data field. That is, as in the above example, assuming that contents indicating 'date: 2016-03-01, amount: 5,000 Won, where: Pangyo branch' are contained in a personalized message, obfuscation may be realized by inserting security characters into a single data field, like 'da&te: 2016-ㄱ03-ㄴ01, 2016, aㅌ mount: ㄷ5,000 Won, whe^re: Pangyo branch'.

That is, the obfuscation of a personalized message according to the present invention may be a process performed such that, when the user views a message through the terminal, he or she can understand the meaning of the message, but it is difficult for a computer system such as a malicious program to identify the meaning of the personalized message, thus preventing data from being extracted.

Here, security characters may include at least one of a space character and a Unicode Private Use Area (PUA) character. For example, assuming that contents indicating 'payment amount: 12,000 Won, place: A Mart' are contained in a personalized message, obfuscation may be realized by changing the contents to 'payment a mount: 1 2, 0 0 0 Won, place: A Mar t' using space characters.

Figure 4:
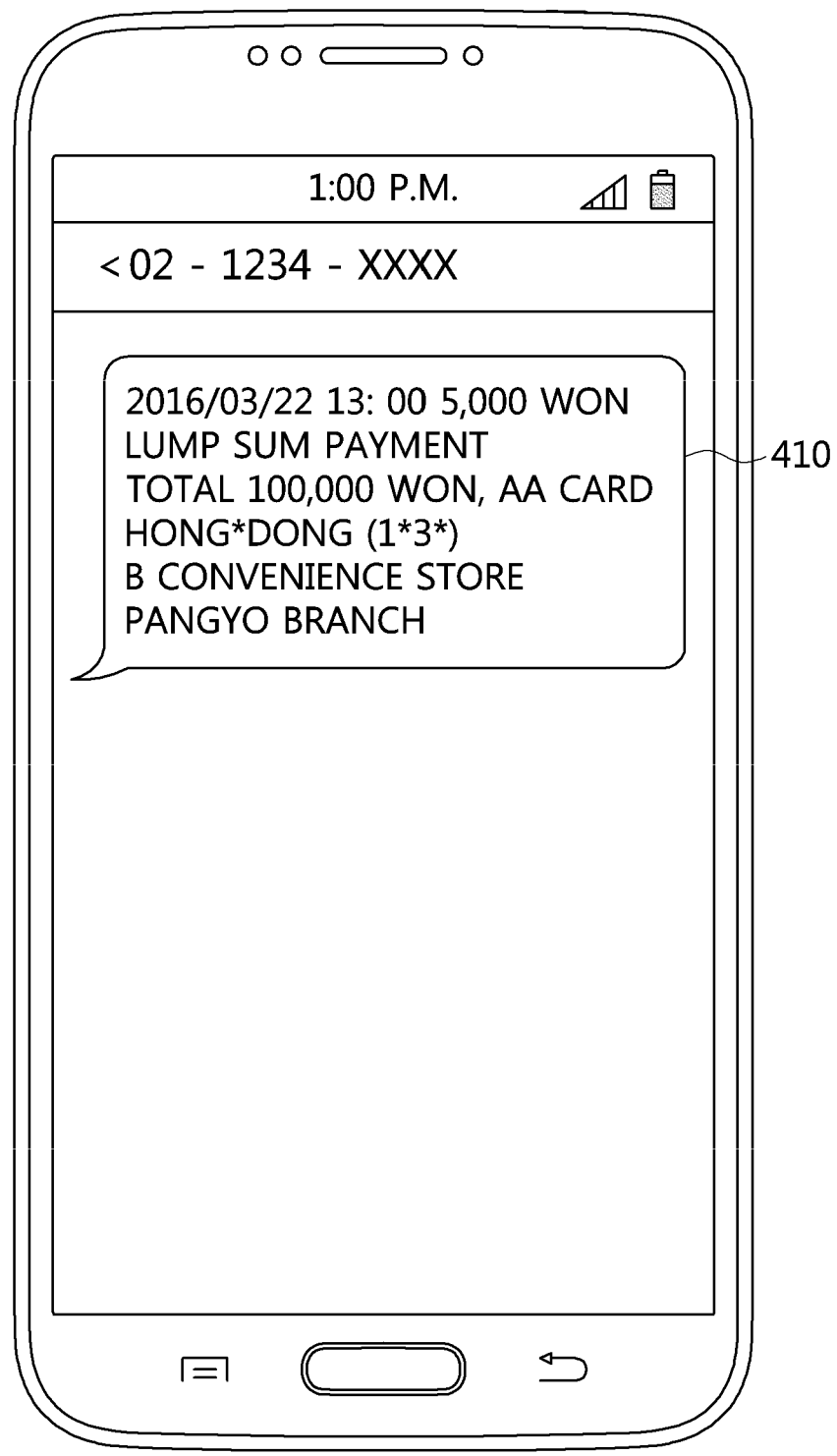
FIG. 4 is a diagram showing an example of a message using a message service.

FIG. 4 is a diagram showing an example of a message using a message service.

Referring to FIG. 4, it can be seen that a message 410 using a message service sequentially includes a date field, a time field, a payment amount field, a monthly installment information field, a cumulative amount field, a card information field, a payment place field, etc.

That is, the message 410 shown in FIG. 4 may generally be a notification message that is sent to the terminal of a user when the user purchases a product with a credit card or a debit card.

In this case, most notification messages are sent such that they have configurations, that is, templates, which are similar or identical to that of the message 410 shown in FIG. 4.

Since most notification messages use normalized templates, there is inconvenience in that a large amount of unnecessary information is provided to the user every time, even if the user does not desire to receive the information.

For example, the user of the terminal shown in FIG. 4 may not desire to check information about his or her cumulative amount. Such cumulative amount information is important information required to check personal expenditures, but it may be easily exposed even if other persons merely view the corresponding notification message, and thus there may be users who do not desire the display of the corresponding information.

Further, when most informational messages are received based on normalized templates, the messages may be very vulnerable to malicious programs for hooking SMS or MMS-based messages.

For example, it may be assumed that a specific malicious program extracts information from a third field corresponding to the payment amount, a fifth field corresponding to the cumulative amount, a sixth field corresponding to the card information, and a seventh field corresponding to the payment place, based on the template such as that shown in FIG. 4. If a malicious program extracts such information by continuously hooking the messages, personal information such as the amount of expenditure of the user, the card frequently used by the user, and stores frequently visited by the user may be collected. Further, the collected personal information may be used as data for crimes or marketing.

Figure 5:
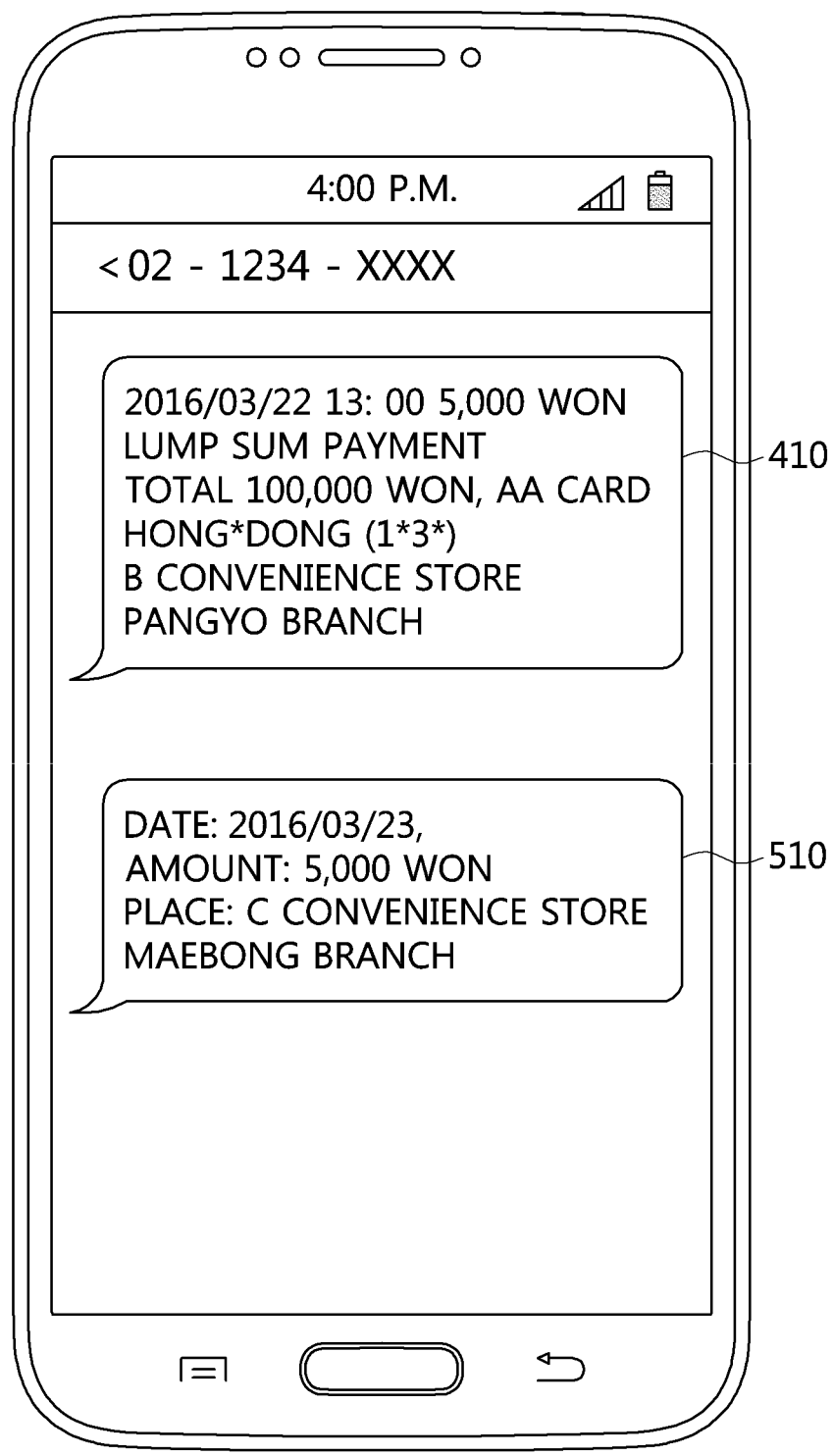
FIG. 5 is a diagram showing an example of a personalized message according to the present invention.

FIG. 5 is a diagram showing an example of a personalized message according to the present invention.

Referring to FIG. 5, a personalized message 510 according to the present invention may be generated based on multiple fields contained in the message 410 shown in FIG. 4.

That is, it can be seen that, among the date field, the time field, the payment amount field, the monthly installment information field, the cumulative amount field, the card information field, and the payment place field, which are contained in the message 410 shown in FIG. 4, only the date field, the payment amount field, and the payment place field are selected and used to generate the personalized message 510.

Here, the personalized message 510 may be generated based on a personalized template created based on the selection by the user. That is, when the configuration of multiple fields is provided to the user, the user selects data fields including desired information from among the multiple fields, thus enabling a personalized template to be created.

Referring to FIG. 4 by way of example, the configuration of the date field, the time field, the payment amount field, the monthly installment information field, the cumulative amount field, the card information field, and the payment place field may be provided to the user. In this case, the user may access the secure message-sending server through a separate PC or a user terminal and then check the configuration of the multiple fields. Thereafter, the user may deliver information for creating a personalized template to the secure message-sending server by selecting the date field, the payment amount field, and the payment place field from among the multiple fields.

Therefore, the secure message-sending server may create a personalized template based on the information selected by the user, and may generate the personalized message 510 such as that shown in FIG. 5 based on the created personalized template.

Figure 6:
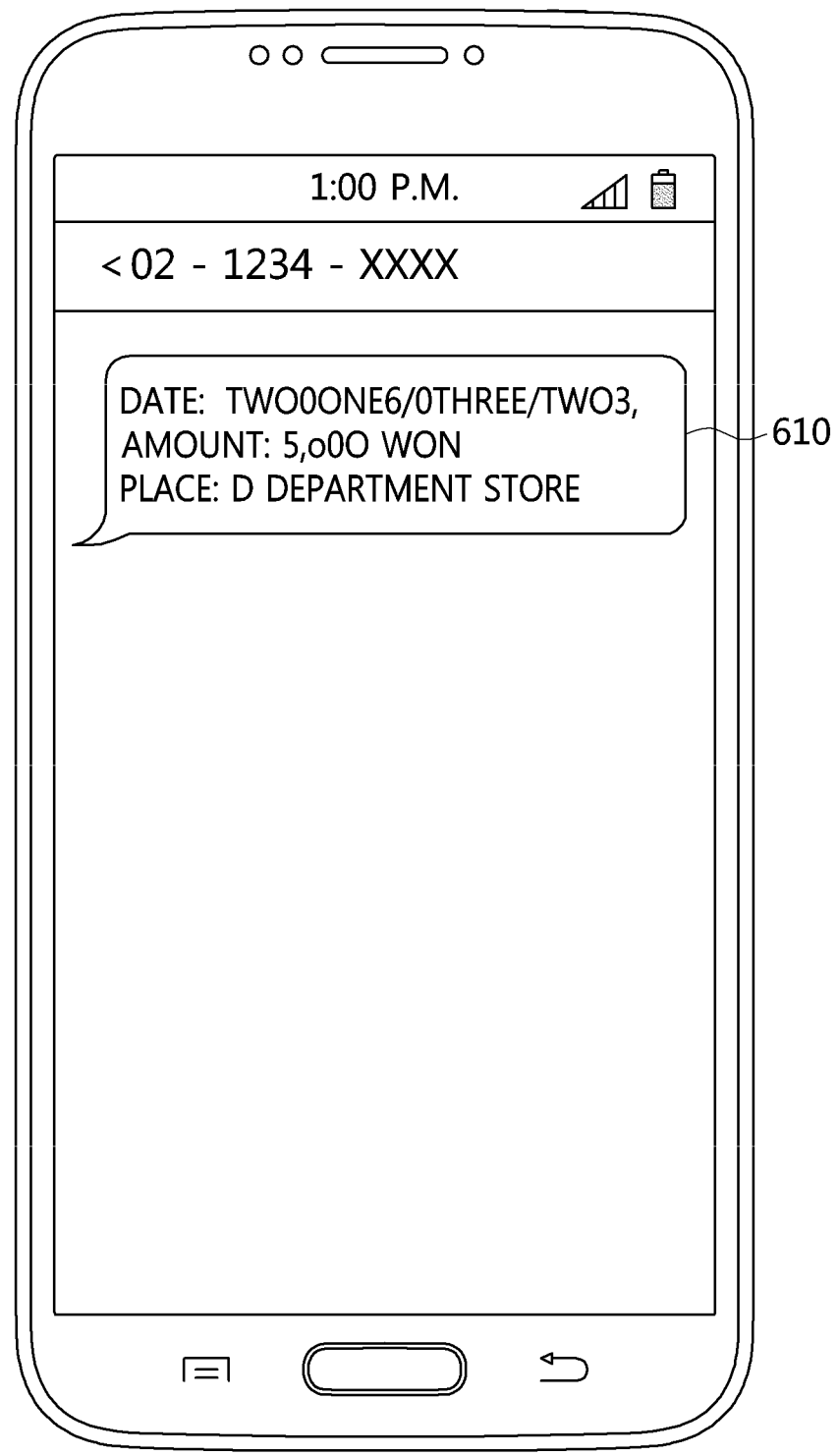
FIGS. 6 and 7 are diagrams showing examples of a secure message according to the present invention.
Figure 7:

FIGS. 6 and 7 are diagrams showing examples of a secure message according to the present invention.

Referring to FIGS. 6 and 7, secure messages 610 and 710 according to the present invention may be generated by replacing characters in a personalized message with security characters or by inserting security characters into the personalized message.

First, referring to the secure message 610 shown in FIG. 6, it can be seen that the secure message has been generated from the personalized message via replacement with security characters.

That is, before replacement with security characters in the secure message 610, the contents of the personalized message may indicate 'date: 2016/03/23, amount: 5,000 Won, place: D department store'.

In this regard, in consideration of the meaning of the characters contained in the personalized message, the characters may be replaced with security characters so that, when the user views the secure message 610, the meaning thereof is not changed.

For example, even if obfuscation is performed by replacing '2016' with 'Two0One6', the user, that is, a human being, may understand that the two words mean the year 2016. However, it is difficult for a computer program such as a malicious program to recognize that the two words are identical to each other, and thus the corresponding message may not be hooked.

Further, as shown in FIG. 7, the secure message 710 may be generated via the insertion of security characters into a personalized message.

That is, before security characters are inserted into the secure message 710, the contents of the personalized message indicate 'date: 2016-03-23, amount: 5,000 Won, place: E Restaurant'.

In this case, obfuscation may be performed by inserting '!@#$' corresponding to symbols, 'GANADARA (가나다라)' corresponding to Korean letters, and 'ABCD' corresponding to English letters into respective spaces between the data fields contained in the personalized message.

That is, the user, who is a human being, may acquire payment information without difficulty when reading the secure message 710 shown in FIG. 7, but the computer program such as a malicious program may have difficulty in definitely determining whether the corresponding contents indicate payment information due to the inserted security characters.

Figure 8:
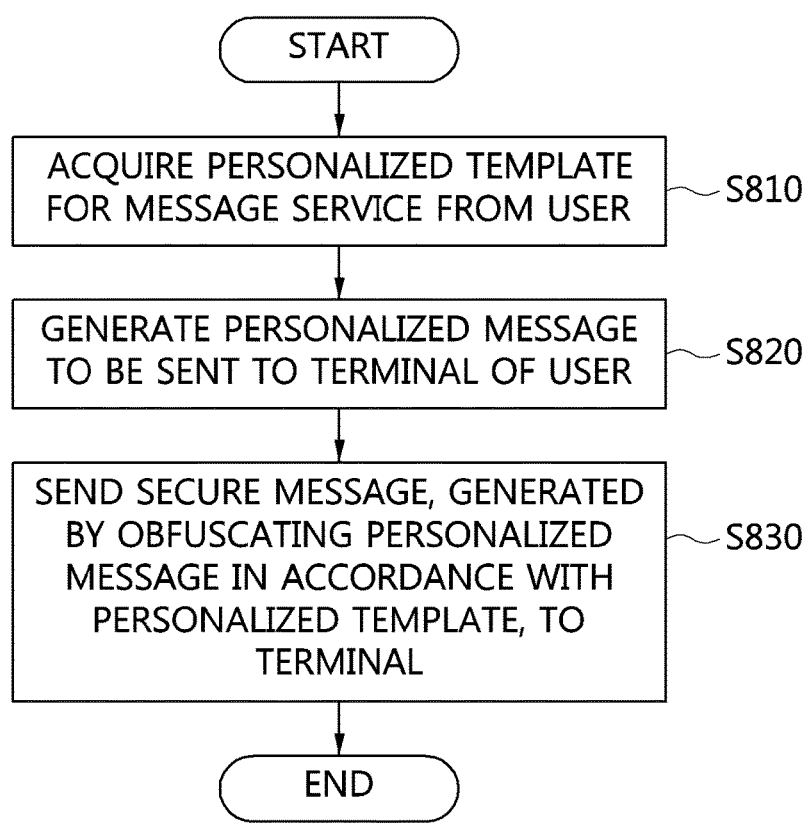
FIG. 8 is an operation flowchart showing a secure message-sending method using a personalized template according to an embodiment of the present invention.

FIG. 8 is an operation flowchart showing a secure message-sending method using a personalized template according to an embodiment of the present invention.

Referring to FIG. 8, the secure message-sending method using a personalized template according to an embodiment of the present invention acquires a personalized template for a message service from a user at step S810.

Most malicious programs for hooking messages based on a Short Message Service (SMS) or a Multimedia Message Service (MMS) may be operated such that when each message is received by the terminal of the user, SMS messages are sorted using a normalized template, which is the basic structure of messages, and required data is extracted from the sorted SMS messages. In this case, assuming that the template of the message deviates from a normalized form, the probability that the corresponding SMS message will be analyzed by a malicious program and then data will be leaked may be decreased.

Therefore, in order to minimize the damage resulting from data leakage caused by such a malicious program, the present invention may apply a personalized template for an SMS message to be received to each individual and may use the personalized template. That is, since most personalized templates may be differently configured for respective users, it may be difficult to seize data using a malicious program.

In order to acquire a personalized template, information for creating the personalized template may be first acquired through the terminal of the user such as a PC.

In this case, among multiple data fields, the fields selected by the user may be acquired as one or more data fields, and a personalized template may be created in consideration of the arrangement of the one or more data fields.

For example, the user may access a program or an application corresponding to the secure message-sending server 110 using a PC and may then select one or more data fields. That is, when multiple data fields are provided to the user through the program or application corresponding to the secure message-sending server 110, the user may select one or more data fields so that only required information, among the multiple data fields, is contained in a message.

For example, when a personalized template related to payment is created, the secure message-sending server 110 may provide the following multiple data fields.

{payment date}{payment amount}{total payment amount}{payment store name}

Here, when the user desires to check only {payment date}, {payment amount}, and {payment store name}, among the given multiple data fields, via a message, a personalized template may be created by selecting only the corresponding fields.

In addition to the PC of the user, all means capable of delivering information for creating the personalized template to the secure message-sending server 110 may be utilized.

Further, even if the configurations of the one or more data fields are identical to each other, personalized templates including the data fields may be recognized as different personalized templates according to the arrangement of the data fields.

For example, it may be assumed that both of two messages for providing payment details include a date field, a time field, and a payment amount field. At this time, when one message contains these elements in the sequence of the date field, the time field, and the payment amount field, and the other message contains these elements in the sequence of the payment amount field, the time field, and the date field, the templates of the two messages may be determined to be different from each other.

Therefore, when information about a personalized template is acquired from the user, information about the sequence of data fields included in the personalized template may also be acquired together with information about the data fields.

Further, the secure message-sending method using a personalized template according to the embodiment of the present invention generates a personalized message to be sent to the terminal of the user based on the personalized template at step S820.

For example, when a message-sending event occurs from the service server, a personalized message containing only the information desired by the user may be generated based on message contents corresponding to the message-sending event and the personalized template.

In this case, the personalized message may be generated such that, among multiple data fields constituting a message via the message service, one or more data fields designated in accordance with the personalized template are contained in the personalized message.

Here, the multiple data fields may include a date field, a time field, a payment amount field, a cumulative amount field, a payment means field, a payment location field, a point field, a payer field, etc.

In an example, when the message service is a service for providing payment details, a date field indicating the date on which payment was made, a time field indicating the time at which payment was made, a payment amount field indicating the amount paid for a product, a payment location field indicating the store in which payment was made, etc. may correspond to the multiple data fields.

In another example, in the case of a message service for providing usage details for a credit card, a payment means field indicating information about a credit card used for payment, a date field and a time field indicating the date and time at which the credit card was used, a payment amount field indicating the amount paid by the credit card, a cumulative amount field indicating a total amount cumulatively spent on the credit card to date, etc. may correspond to the multiple data fields.

That is, depending on the types of message service, the types of the multiple data fields may also vary.

Next, the secure message-sending method using a personalized template according to the embodiment of the present invention generates a secure message by obfuscating the personalized message in accordance with the personalized template, and sends the secure message to the terminal at step S830.

In this regard, by means of obfuscation, the effect of secondarily preventing malicious programs from hooking messages may be provided. That is, malicious programs may extract required information by analyzing messages based on data having a specific word or a specific structure. For example, when a specific word contained in a message is composed of only numbers, a malicious program may extract information by determining the corresponding message to be data related to a payment amount or data related to a date.

Therefore, in order to prevent this problem, the secure message may be generated by obfuscating the contents of the message with characters that cannot be recognized by software such as a malicious program or a system, but can be recognized by a human being.

In this case, the types of one or more data fields may be checked, and the secure message may be generated using security characters in a mode corresponding to the checked types.

For example, whether the data field is a date field or a payment amount field mainly composed of numbers or whether the data field is a location field mainly composed of characters other than numbers is checked. Then, a secure message may be generated using security characters in the mode corresponding to the result of the checking.

Here, in consideration of the meaning of the characters included in the one or more data fields, the characters may be replaced with security characters.

In this regard, a separate obfuscation table is configured, and characters included in the obfuscation table, among the characters contained in the message, may be replaced with security characters set in the obfuscation table.

For example, it may be assumed that the obfuscation table is generated as shown in the following Table 2.

TABLE 2

| Character contained in message | Security character |
|---|---|
| 0(number) | O(Korean), o(English), 영(Korean pronunciation of 0), 공 (another Korean pronunciation of 0) |
| 1 | l(symbol), I(English), 일(Korean pronunciation of 1) |
| 2 | 이(Korean pronunciation of 2) |
| ... | ... |

Assuming that date information such as 'date: 2016-02-12' is contained in a personalized message, the date information may be replaced by 'date: 이공일육-O2-1이' via the obfuscation table.

In this case, the obfuscation table may be continuously updated. Further, when multiple security characters match a single character, a great variety of obfuscation may be realized by randomly utilizing the security characters to be used for replacement.

Moreover, security characters may be inserted into spaces between one or more data fields.

In an example, assuming that contents indicating 'date: 2016-03-01, amount: 5,000 Won, where: Pangyo branch' are contained in the 'personalized message', obfuscation may be realized by inserting security characters into spaces between data fields, like 'date: 2016-03-01, !@#$amount: 5,000 Won, ㄱㄴㄷㄹ where: Pangyo branch'.

In another example, security characters may be inserted into the contents of a data field. That is, as in the above example, obfuscation may be realized by inserting security characters into a single data field in the personalized message, like 'da&te: 2016-ㄱ03-ㄴ01, 2016, aㅌmount: ㄷ5,000 Won, wheˆre: Pangyo branch'.

That is, the obfuscation of a personalized message according to the present invention may be a process performed such that, when the user views a message through the terminal, he or she can understand the meaning of the message, but it is difficult for a computer system such as a malicious program to identify the meaning of the personalized message, thus preventing data from being extracted.

When each of the one or more data fields is a number field composed of numbers, obfuscation may be performed based on replacement with security characters, whereas when each of the one or more data fields is a character field composed of characters other than numbers, obfuscation may be performed based on the insertion of security characters.

For example, numbers such as 1, 2, and 3 may be converted into Korean characters such as '일, 이, and 삼' and into characters such as I, II, and III, but it may be difficult to convert characters other than numbers into other characters.

Therefore, it is first determined whether a data field included in a personalized message is a number field composed of mostly numbers, or a character field composed of characters other than numbers, and then a suitable obfuscation method may be selected.

Here, a number included in each of the one or more data fields may be replaced with a character (letter), rather than a number, that has the same pronunciation as that of the number or has a shape similar to that of the number.

For example, '0' may be replaced with '영' or '공,' having the same pronunciation as '0' when spoken, and '1' may be replaced with '일'.

Here, security characters may include at least one of a space character and a Unicode Private Use Area (PUA) character. For example, assuming that contents indicating 'payment amount: 12,000 Won, place: A Mart' are contained in a personalized message, obfuscation may be realized by changing the contents to 'payment a mount: 1 2, 0 0 0 Won, place: A Mar t' using space characters.

Although not shown in FIG. 8, the secure message-sending method using a personalized template according to the present invention transmits and receives information required for the sending of a secure message to and from either a service server for providing a message service or the terminal of the user over a communication network, such as a typical network. In particular, a message-sending event may be received from the service server, and the generated secure message may be provided to the terminal of the user.

Further, although not shown in FIG. 8, the secure message-sending method using a personalized template according to the embodiment of the present invention stores various types of information generated during a secure message-sending procedure according to an embodiment of the present invention.

In accordance with an embodiment, a storage module for storing information may be configured independently of the secure message-sending server to support a secure message-sending function. Here, the storage module may function as separate large-capacity storage, and may include a control function for performing operations.

By utilizing such a secure message-sending method, each message is configured based on a personalized template, thus allowing the user to be selectively provided only with required data.

Also, since a personalized template is used, damage resulting from a malicious program for hooking SMS or MMS messages may be prevented or minimized.

Furthermore, since each message is obfuscated, damage resulting from hooking programs may be prevented.

Figure 9:
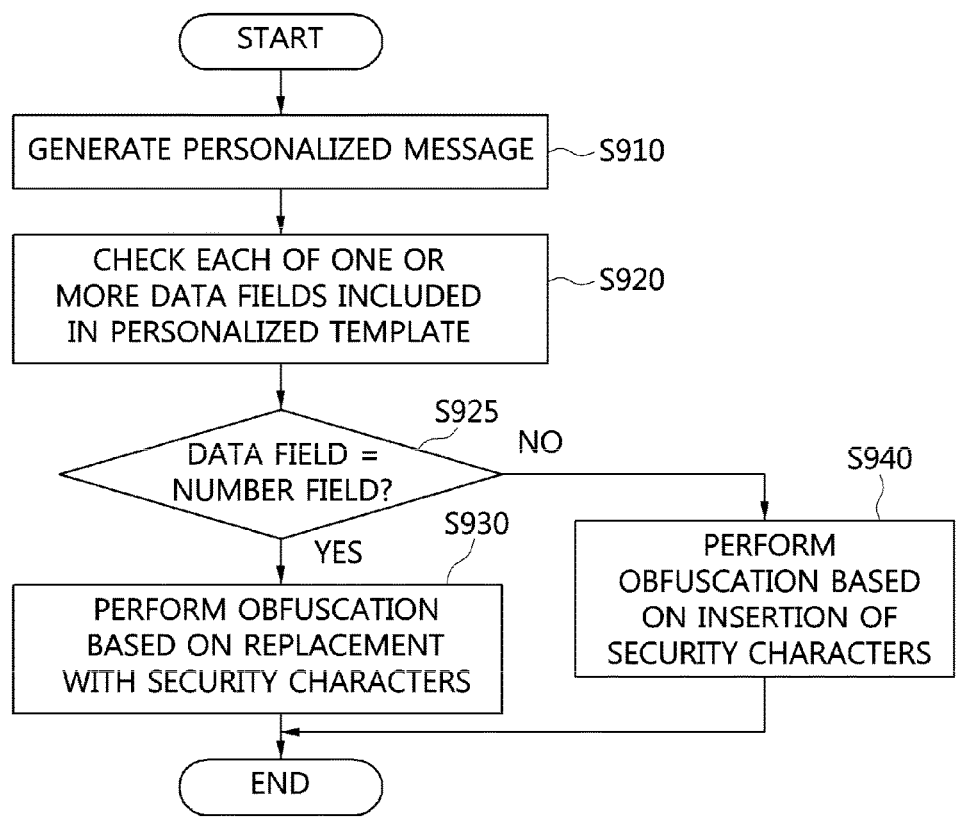
FIG. 9 is an operation flowchart showing in detail a procedure for performing obfuscation in the secure message-sending method using a personalized template according to an embodiment of the present invention.

FIG. 9 is an operation flowchart showing in detail a procedure for performing obfuscation in the secure message-sending method using a personalized template according to an embodiment of the present invention.

Referring to FIG. 9, in the procedure for performing obfuscation in the secure message-sending method using a personalized template according to the embodiment of the present invention, when a personalized message is generated at step S910, one or more data fields included in a personalized template are checked at step S920.

Here, the personalized template may include one or more data fields corresponding to the personalized template, among multiple data fields contained in a message provided by a message service.

Further, the personalized template may be created by the user selecting one or more data fields from among the multiple data fields.

Thereafter, whether each data field is a number field is determined at step S925. If it is determined at step S925 that the data field is a number field, obfuscation is performed based on replacement with security characters at step S930.

For example, numbers such as 1, 2, and 3 may be converted into Korean characters such as '일, 이, and 삼' and into characters such as I, II, and III, but it may be difficult to convert characters other than numbers into other characters.

Therefore, it is first determined whether a data field included in a personalized message is a number field composed of mostly numbers, or a character field composed of characters other than numbers, and then a suitable obfuscation method may be selected.

Here, a number included in each of the one or more data fields may be replaced with a character (letter), rather than a number, that has the same pronunciation as that of the number or has a shape similar to that of the number.

For example, '0' may be replaced with '영' or '공,' having the same pronunciation as '0' when spoken, and '1' may be replaced with '일'.

On the other hand, if it is determined at step S925 that the data field is a not a number field, the data field is determined to be a character field composed of characters other than numbers, and obfuscation is performed via the insertion of security characters at step S940.

In an example, assuming that contents indicating 'date: 2016-03-01, amount: 5,000 Won, where: Pangyo branch' are contained in the personalized message, obfuscation may be realized by inserting security characters into the personalized message, like 'date: 2016-03-01, !@#$amount: 5,000 Won, ㄱㄴㄷㄹ where: Pangyo branch'.

In another example, security characters may be inserted into the contents of a data field. That is, as in the above example, assuming that contents indicating 'date: 2016-03-01, amount: 5,000 Won, where: Pangyo branch' are contained in a personalized message, obfuscation may be realized by inserting security characters into a single data field, like 'da&te: 2016-ㄱ03-ㄴ01, 2016, aㅌmount: ㄷ5,000 Won, wheˆre: Pangyo branch'.

Here, security characters may include at least one of a space character and a Unicode Private Use Area (PUA) character. For example, assuming that contents indicating 'payment amount: 12,000 Won, place: A Mart' are contained in a personalized message, obfuscation may be realized by changing the contents to 'payment a mount: 1 2, 0 0 0 Won, place: A Mar t' using space characters.

Figure 10:
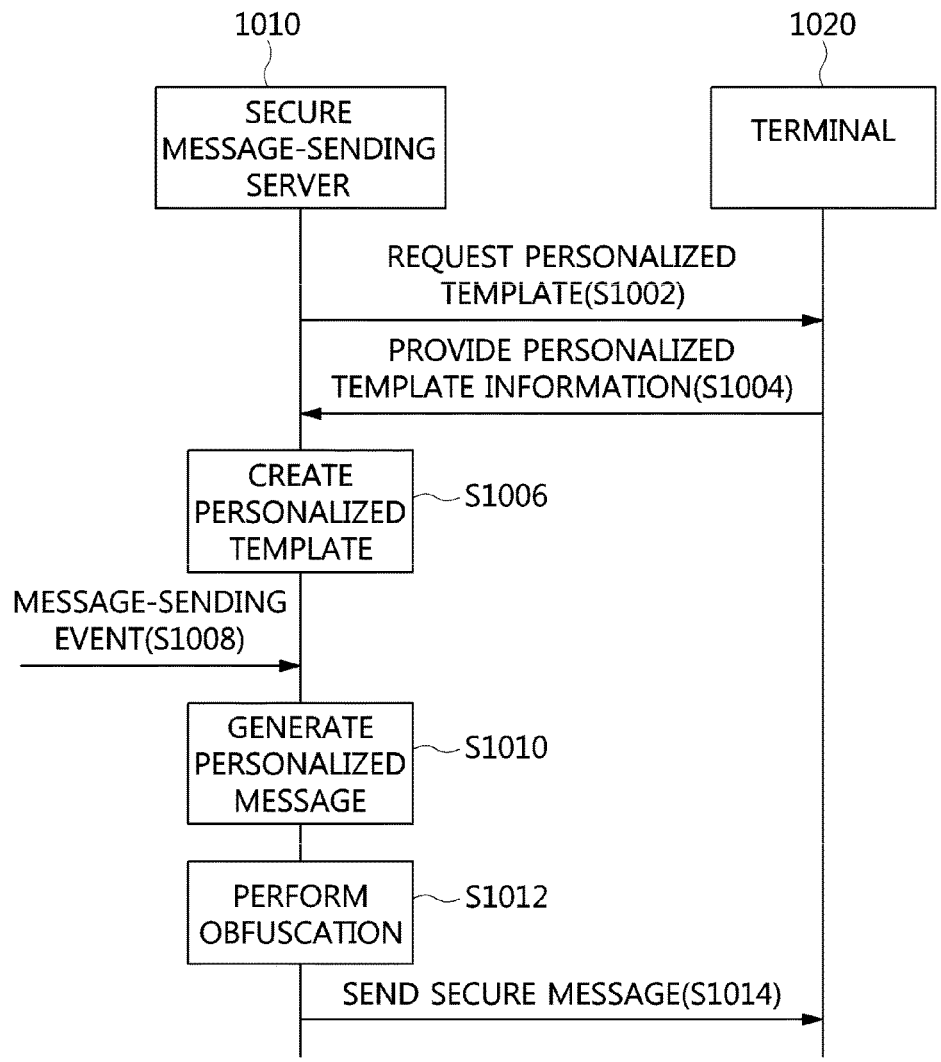
FIG. 10 is a flow diagram showing a secure message-sending procedure using a personalized template according to an embodiment of the present invention.

FIG. 10 is a diagram showing a secure message transmission procedure using a personalized template according to an embodiment of the present invention.

Referring to FIG. 10, in the secure message-sending procedure using a personalized template according to the embodiment of the present invention, a secure message-sending server 1010 may request information for creating a personalized template from the terminal 1020 of a user at step S1002.

Here, the terminal 1020 may be a terminal for receiving a secure message from the secure message-sending server 1010 while functioning to access the secure message-sending server 1010 and to provide the information for creating a personalized template.

Here, when the user accesses the secure message-sending server 1010 through the terminal 1020, the secure message-sending server 1010 may provide multiple data fields so as to create a personalized template.

Thereafter, the user may provide information for creating the personalized template through the terminal 1020 at step S1004. That is, when the user selects the data fields determined to be needed from among the multiple data fields provided by the secure message-sending server 1010, information about the data fields selected by the user may be provided to the secure message-sending server 1010.

Here, information about the sequence of the data fields selected by the user, together with information about the selected data fields, may also be provided.

Thereafter, the secure message-sending server 1010 may create a personalized template at step S1006.

Here, the data fields selected by the user from among the multiple data fields are acquired as one or more data fields, and a personalized template may be created in consideration of the arrangement of the one or more data fields.

For example, when a personalized template related to payment is created, the secure message-sending server 1010 may provide the following multiple data fields.

{payment date}{payment amount}{total payment amount}{payment store name}

Here, when the user desires to check only {payment date}, {payment amount}, and {payment store name}, among the given multiple data fields, via a message, a personalized template may be created by selecting only the corresponding fields.

Thereafter, the secure message-sending server 1010 may receive a message-sending event from the service server at step S1008.

In this case, when the user uses service provided based on the service server, the service server may generate a message-sending event including information about payment, reservation or purchase for the terminal 1020 of the user and may deliver the message-sending event to the secure message-sending server 1010.

For example, when the service server is a server for providing service related to banks, an event for transmitting bank statement information related to a bankbook may be generated. Further, when the service server is a server for providing service related to a payment means such as a debit card or a credit card, a message-sending event for providing payment information to the terminal 1020 of the user may be generated.

Thereafter, the secure message-sending server 1010 may generate a personalized message at step S1010.

In this case, a personalized message containing only information desired by the user may be generated based on both the message contents corresponding to the message-sending event and the personalized template.

In this case, the personalized message may be generated such that, among multiple data fields constituting a message based on a message service, one or more data fields, one or more data fields designated in accordance with the personalized template are contained in the personalized message.

Thereafter, the secure message-sending server 1010 performs obfuscation on the personalized message at step S1012, and may send a secure message, generated via obfuscation, to the terminal 1020 of the user at step S1014.

In this regard, by means of obfuscation, the effect of secondarily preventing malicious programs from hooking messages may be provided. That is, malicious programs may extract required information by analyzing messages based on data having a specific word or a specific structure. For example, when a specific word contained in a message is composed of only numbers, a malicious program may extract information by determining the corresponding message to be data related to a payment amount or data related to a date.

Therefore, in order to prevent this problem, the secure message may be generated by obfuscating the contents of the message with characters that cannot be recognized by software such as a malicious program or a system, but can be recognized by a human being.

In this case, the types of one or more data fields may be checked, and the secure message may be generated using security characters in a mode corresponding to the checked types.

Here, in consideration of the meaning of the characters included in the one or more data fields, the characters may be replaced with security characters.

In this regard, a separate obfuscation table is configured, and characters included in the obfuscation table, among the characters contained in the message, may be replaced with security characters set in the obfuscation table.

Further, security characters may be inserted into spaces between one or more data fields.

In an example, assuming that contents indicating 'date: 2016-03-01, amount: 5,000 Won, where: Pangyo branch' are contained in the 'personalized message', obfuscation may be realized by inserting security characters into spaces between data fields, like 'date: 2016-03-01, !@#$amount: 5,000 Won, ㄱ ㄴ ㄷ ㄹ where: Pangyo branch'.

When each of the data fields is a number field composed of numbers, obfuscation may be realized based on replacement with security characters, whereas when each of the data fields is a character field composed of characters other than numbers, obfuscation may be realized based on the insertion of security characters.

A number included in each data field may be replaced with a character (letter), rather than a number, that has the same pronunciation as that of the number or has a shape similar to that of the number.

Here, the security characters may include at least one of a space character and a Unicode PUA character.

The secure message-sending method according to the present invention may be implemented as program instructions that can be executed by various computer means, and the program instructions may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

In accordance with the present invention, each message is configured based on a personalized template, thus enabling a user to be selectively provided only with required data.

Further, the present invention may prevent or minimize damage resulting from a malicious program for hooking SMS or MMS messages by utilizing a personalized template.

Furthermore, the present invention may prevent damage resulting from a hooking program by obfuscating messages.

In accordance with the present invention, a personalized template for a message service is acquired from a user, and a personalized message to be sent to the terminal of the user is generated based on the personalized template and is obfuscated in accordance with the personalized template to generate a secure message, after which the generated secure message may be sent to the terminal. Furthermore, the user may receive only desired information through the message service, and a message provider may prevent messages from being hooked by a malicious program and may also prevent damage resulting from the malicious program, without modifying existing infrastructure.

As described above, in the secure message-sending method using a personalized template and the apparatus using the method according to the present invention, the configurations and schemes in the above-described embodiments are not limitedly applied, and some or all of the above embodiments can be selectively combined and configured so that various modifications are possible.

What is claimed is:

1. A secure message-sending server, comprising:
a processor configured to perform a process to provide a service; and
a memory configured to store processor-readable instructions that, when executed by the processor, cause the processor to:
acquire a personalized template for a message service from a user;
generate a personalized message to be sent to a terminal of the user based on the personalized template;
generate a secure message by obfuscating the personalized message in accordance with the personalized template, and send the secure message to the terminal;
generate the personalized message such that, among multiple data fields comprising a message based on the message service, one or more data fields, designated in accordance with the personalized template, are included in the personalized message; and
check types of the one or more data fields and generate the secure message using security characters in a mode corresponding to the types of the one or more data fields.

2. The secure message-sending server of claim 1, wherein the memory configured to store the processor-readable instructions that, when executed by the processor, further cause the processor to:
   replace characters included in the one or more data fields with the security characters in consideration of a meaning of the characters; and
   insert the security characters into spaces between the one or more data fields.

3. The secure message-sending server of claim 1, wherein the memory configured to store the processor-readable instructions that, when executed by the processor, cause the processor to:
   when each of the one or more data fields is a number field composed of numbers, perform obfuscation based on the replacements; and
   when each of the one or more data fields is a character field composed of characters other than numbers, perform obfuscation based on the insertion.

4. The secure message-sending server of claim 1, wherein the memory configured to store the processor-readable instructions that, when executed by the processor, cause the processor to: replace each of numbers included in the one or more data fields with a character, rather than a number, that has a pronunciation identical to that of the number.

5. The secure message-sending server of claim 1, wherein the security characters include at least one of a space character and a Unicode Private Use Area (PUA) character.

6. The secure message-sending server of claim 1, wherein the memory configured to store the processor-readable instructions that, when executed by the processor, cause the processor to:
   acquire fields, selected by the user from among the multiple data fields, as the one or more data fields; and
   create the personalized template in consideration of arrangement of the one or more data fields.

7. The secure message-sending server of claim 1, wherein the multiple data fields include a date field, a time field, a payment amount field, a cumulative amount field, a payment means field, a payment location field, a point field, and a payer field.

8. A secure message-sending method, comprising:
   acquiring a personalized template for a message service from a user;
   generating a personalized message to be sent to a terminal of the user based on the personalized template; and
   generating a secure message by obfuscating the personalized message in accordance with the personalized template, and sending the secure message to the terminal,
   wherein generating the personalized message comprises generating the personalized message such that, among multiple data fields comprising a message based on the message service, one or more data fields, designated in accordance with the personalized template, are included in the personalized message, and
   wherein generating the secure message comprises checking types of the one or more data fields and generating the secure message using security characters in a mode corresponding to the types of the one or more data fields.

* * * * *